Jan. 12, 1926.  
F. H. JONES  
SHOCK ABSORBER  
Filed March 5, 1925  
1,569,229
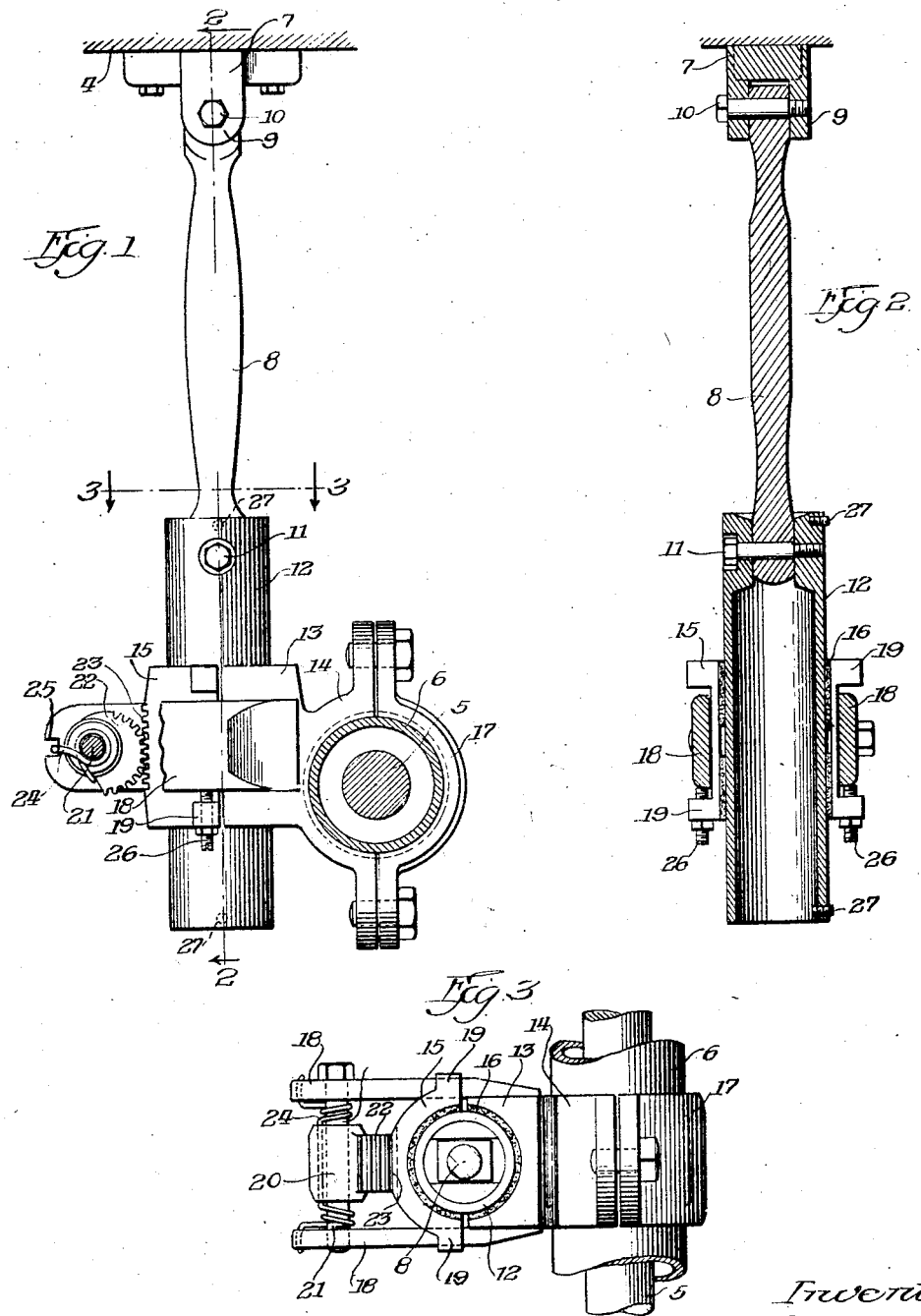
Inventor:
Francis H. Jones Patented Jan. 12, 1926.

1,569,229

UNITED STATES PATENT OFFICE.

FRANCIS HERBERT JONES, OF CICERO, ILLINOIS.

SHOCK ABSORBER.

Application filed March 5, 1925. Serial No. 13,297.

*To all whom it may concern:*

Be it known that I, FRANCIS HERBERT JONES, a citizen of the United States, residing at Cicero, in the county of Cook and State of Illinois, have invented a new and useful Shock Absorber, of which the following is a specification.

The invention relates to improvements in shock absorbers for vehicles, such as automobiles, motor trucks and the like, and has for its primary object the provision of a shock absorber which is extremely simple in construction, efficient in operation and long lived in use.

Another object is to provide a shock absorber which dispenses with heavy springs and other resilient parts, commonly employed in prior shock absorbers to oppose and check the violent and sudden movements of the vehicle body when passing over rough roads and other rough places.

A more specific object is to provide a novel shock absorber which comprises a part connected to the body of the vehicle, and a second part mounted on the chassis of the vehicle and frictionally engaging said first mentioned part to permit freedom of bound and to resist and retard upward movement or rebound of said first mentioned part.

Still another object resides in the provision in a shock absorber of an eccentric cam gear operating through a friction element to check the rebound of the vehicle.

Ancillary objects and advantages will become apparent as the description proceeds.

In the accompanying drawings, Figure 1 is a side view of a shock absorber embodying of the features of my invention.

Fig. 2 is a sectional view thereof taken along line 2—2 of Fig. 1.

Fig. 3 is a horizontal sectional view thereof taken along line 3—3 of Fig. 1.

While my invention is susceptible to various modifications and alternative constructions, I have shown in the drawings and will herein describe in detail the preferred embodiment, but it is to be understood that I do not thereby intend to limit the invention to the specific form disclosed, but aim in the appended claims to cover all modifications and alternative constructions falling within the spirit and scope of the invention.

Referring to the drawings, 4 represents the underside of a vehicle body, and 5 designates the rear axle of the vehicle which extends through a suitable housing 6.

Pivotally secured to the underside of the body 4 by means of a bracket 7 is a downwardly extending connecting rod 8. In the present instance, the upper end of the rod 8 is secured between two spaced arms 9 on the bracket 7 by a pivot pin 10. The lower end of the rod 8 is pivotally secured by a pivot pin 11 in the upper end of an elongated hollow cylinder or piston 12.

The piston 12 is slidably disposed in a friction clamp which comprises a rigid part 13 formed on a bracket 14, and a cap or shoe 15 loosely engaging the piston. Suitable packing 16 is provided on the part 13 and the shoe 15 next to the piston.

In the present instance, the bracket 14 is adjustably secured to the housing 6 by means of a clamping plate 17, and is formed integral with a pair of spaced horizontal arms 18, between which the shoe 15 is loosely mounted. Each side of the shoe 15 is formed with a pair of lugs 19 which project laterally beyond the arms 18 and serve to limit the vertical movement of the shoe.

Means is provided for clamping the shoe into frictional engagement with the piston 12 to resist upward movement of the latter and thereby check the rebound of the vehicle body 4 after a sudden jar. This means in the present instance comprises an eccentric cam member 20 which is loosely mounted on a pintle 21 extending through the free ends of the arms 18. The working surface of the cam member 20 is formed with teeth 22 which mesh with the teeth of a vertical rack 23, formed on the shoe 15. The cam member 20 is so disposed relative to the shoe 15 that upon an upward movement of the latter it exerts an inward pressure against said shoe to bind the piston 12. To hold the teeth 22 in engagement with the rack teeth 23 and thereby insure rotation of the cam member 20 with movement of the shoe 15, a spring 24 wound around the pintle 21 and engaging in notches 25 in the ends of the arms 18, engages the cam member and tends to rotate the latter upwardly.

Preferably, screws 26 are threaded through the lower lugs 19 to adjust the limit of vertical movement of the shoe 15. Stop screws 27 in opposite ends of the piston 12 serve to prevent the latter from moving out of the clamp.

In operation, when the vehicle is subjected to sudden and violent jars, the body 4 will move downwardly. This movement will force the piston 12 downwardly in the clamp of the shock absorber. Due to the frictional engagement between the piston 12 and the shoe 15, the latter will also be moved downwardly to a slight extent, and in so doing will rotate the cam member 20 downwardly, thereby loosening the shoe 15 and permitting a free bound of the body 4. On the rebound of the body 4, the piston 12 will raise the shoe 15 which thereupon will rotate the cam member 20 upwardly to clamp the shoe frictionally against the peripheral surface of the piston 12, thereby effectively checking the rebound of the body.

It will be evident that I have provided a simple and inexpensive shock absorber which can be readily applied to vehicles of all kinds, whether already in use or not, which is sturdy in construction and not subject to material wear, and which is extremely efficient in operation. The shock absorber dispenses with heavy springs and the like heretofore commonly employed in other shock absorbers.

I claim as my invention:

1. A shock absorber having, in combination, a cylinder adapted to be pivotally mounted on the underside of the body of a vehicle, a clamp adapted to be rigidly mounted on the chassis of the vehicle and loosely embracing said cylinder, said clamp having a pair of spaced arms extending beyond opposite sides of said cylinder, a movable clamp shoe loosely mounted between said arms and adapted to frictionally engage one side of said cylinder, said shoe having vertical rack teeth formed on its outer side, a cam gear pivotally mounted between said arms and meshing with said rack, said cam gear being disposed to cause a lateral pressure against said shoe as the latter is moved upwardly, to force said shoe into frictional engagement with said cylinder, and spring means tending to hold said cam gear in engagement with said shoe.

2. A shock absorber having, in combination, a piston, means connecting said piston pivotally to the underside of the body of the vehicle, a bracket secured to the chassis of said vehicle, said bracket having a member frictionally engaging one side of said piston, a shoe loosely mounted in said bracket and positioned to frictionally engage the other side of said piston, means for limiting the vertical movement of said shoe, and gear means actuated through a vertical movement of said shoe and serving to clamp said shoe into frictional engagement with said piston upon movement of the latter in one direction.

3. A shock absorber having, in combination, a piston, means for connecting said piston pivotally to the underside of the body of the vehicle, a bracket adapted to be secured to the chassis of said vehicle, said bracket having a member frictionally engaging one side of said piston, a shoe loosely mounted in said bracket and positioned to frictionally engage the other side of said piston, and gear means actuated through a vertical movement of said shoe and serving to clamp said shoe into frictional engagement with said piston upon movement of the latter in one direction.

4. A shock absorber having, in combination, a member adapted to move with the body of a vehicle, a clamp adapted to be mounted on the chassis of said vehicle and loosely engaging said first mentioned member, and gear means actuated through a relative movement of said first mentioned member and said clamp to force said clamp into frictional engagement with said member to check the rebound of said body.

5. A shock absorber having, in combination, a member adapted to be secured to the body of a vehicle, a split clamp adapted to be mounted on the chassis of said vehicle, said member extending slidably through said clamp and said clamp comprising a loose clamping shoe movable into and out of effectual frictional engagement with said member, and gear means supported by said clamp and engaging said shoe, said gear means being actuated through movement of said shoe and being shaped to exert a pressure against said shoe upon movement in one direction to force said shoe into frictional engagement with said first mentioned member.

6. A shock absorber having, in combination, a member adapted to be secured to the body of a vehicle, a friction clamp adapted to be mounted on the chassis of said vehicle and engaging said member, and eccentric means engaging said clamp, said means being automatically operable upon upward movement of said member to press said clamp against said member, but being ineffectual to do so upon downward movement of said member, thereby permitting a free bound of said body but checking the rebound of said body.

In testimony whereof, I have hereunto affixed my signature.

FRANCIS HERBERT JONES.